United States Patent [19]

Kolb et al.

[11] Patent Number: 5,037,146

[45] Date of Patent: Aug. 6, 1991

[54] LOCK FOR A DETACHABLE VEHICLE BODY PART, PREFERABLY A ROOF, OF A MOTOR VEHICLE

[75] Inventors: Eugen Kolb, Stuttgart; Reinhold Schreiber, Renningen, both of Fed. Rep. of Germany

[73] Assignee: Dr. Ing. h.c.F. Porsche AG, Fed. Rep. of Germany

[21] Appl. No.: 574,758

[22] Filed: Aug. 30, 1990

[30] Foreign Application Priority Data

Aug. 31, 1989 [DE] Fed. Rep. of Germany ....... 3928813

[51] Int. Cl.[5] .......................... B60J 7/185; E05C 3/14

[52] U.S. Cl. .................................... 292/202; 296/224; 292/204; 292/DIG. 5

[58] Field of Search ............... 292/202, 204, 209, 194, 292/DIG. 5, DIG. 7; 296/121, 224, 218

[56] References Cited

U.S. PATENT DOCUMENTS

| | | | |
|---|---|---|---|
| 891,727 | 6/1908 | Peterson | 292/202 |
| 1,338,250 | 4/1920 | Parkes | 292/204 |
| 1,428,725 | 9/1922 | Walters | 292/202 |
| 1,494,512 | 5/1924 | Steiner | 292/202 |
| 1,620,705 | 3/1927 | Waitch | 292/202 |
| 2,301,078 | 11/1942 | Perron | 292/202 |
| 2,423,352 | 7/1947 | Thiele | 292/106 |
| 2,581,816 | 1/1952 | Schlueter | 292/204 |
| 2,831,718 | 4/1958 | Hallek et al. | 292/120.1 |
| 3,281,169 | 10/1966 | Houvener | 292/202 |
| 3,575,452 | 4/1971 | Blomgren | 292/202 |
| 4,702,517 | 10/1987 | Maeda et al. | 296/218 |
| 4,898,410 | 2/1990 | Brin | 292/241 |

FOREIGN PATENT DOCUMENTS

| | | | |
|---|---|---|---|
| 1755688 | 12/1971 | Fed. Rep. of Germany . | |
| 1123388 | 9/1956 | France | 292/209 |

*Primary Examiner*—Eric K. Nicholson
*Assistant Examiner*—Darnell M. Boucher
*Attorney, Agent, or Firm*—Evenson, Wands, Edwards, Lenahan & McKeown

[57] ABSTRACT

A lock for a detachable vehicle body part, particularly a roof of a motor vehicle, includes a fixed receiving device and a movable actuating member. The actuating member, which is pivoted at a pin, has a circular plate with a circle segment-type flattening and is adjustable from a closed position to an open position and vice versa. The adjustments are accomplished by moving the actuating member along a circular path segment. In the closed position, the actuating member reaches over the receiving device.

7 Claims, 2 Drawing Sheets

LOCK FOR A DETACHABLE VEHICLE BODY PART, PREFERABLY A ROOF, OF A MOTOR VEHICLE

The invention relates to a lock mechanism for a motor vehicle body part such as a vehicle roof.

A known lock for a motor vehicle roof, such as described in DE-OS 1 755 688, includes an actuating member which, by means of a nose projection, projects into a receiving device and is held by means of lever members in a locked dead-center position. This construction has good operating characteristics but requires a relatively large amount of space as well as sophisticated parts.

There is therefore needed a lock for a detachable vehicle body part that functions properly, has a simple construction and requires little space.

This need is met according to the present invention wherein a lock includes a fixed receiving device and a movable actuating member. The movable actuating member has a plate which is substantially circular and has a circle segment-type flattening. The plate rests against a flat wall section of the roof and is pivoted about a pin using a sliding surface in such a manner as to adjust the actuating member, via movements along a circular segment path, to a closed and open position.

The actuating member reaches over the fixed receiving device in its closed position and extends away from the receiving device, with the circle segment type flattening at a parallel distance to the fixed receiving device, in its open position.

It is an advantage of the present invention that the actuating member and the receiving device cooperate effectively and hold the roof securely in its position. The actuating member is formed of a simple construction which requires little space and is easy to operate. In addition, in its closed and open positions, the actuating member is fixed by means of the detent arrangement in an appropriate operational manner. Further, a stop slope provides for easy turning of the actuating member into the receiving device and for a defined tension between the roof and the vehicle body.

Other objects, advantages and novel features of the present invention will become apparent from the following detailed description of the invention when considered in conjunction with the accompanying drawings.

DETAILED DESCRIPTION OF THE DRAWINGS

Figure 1:
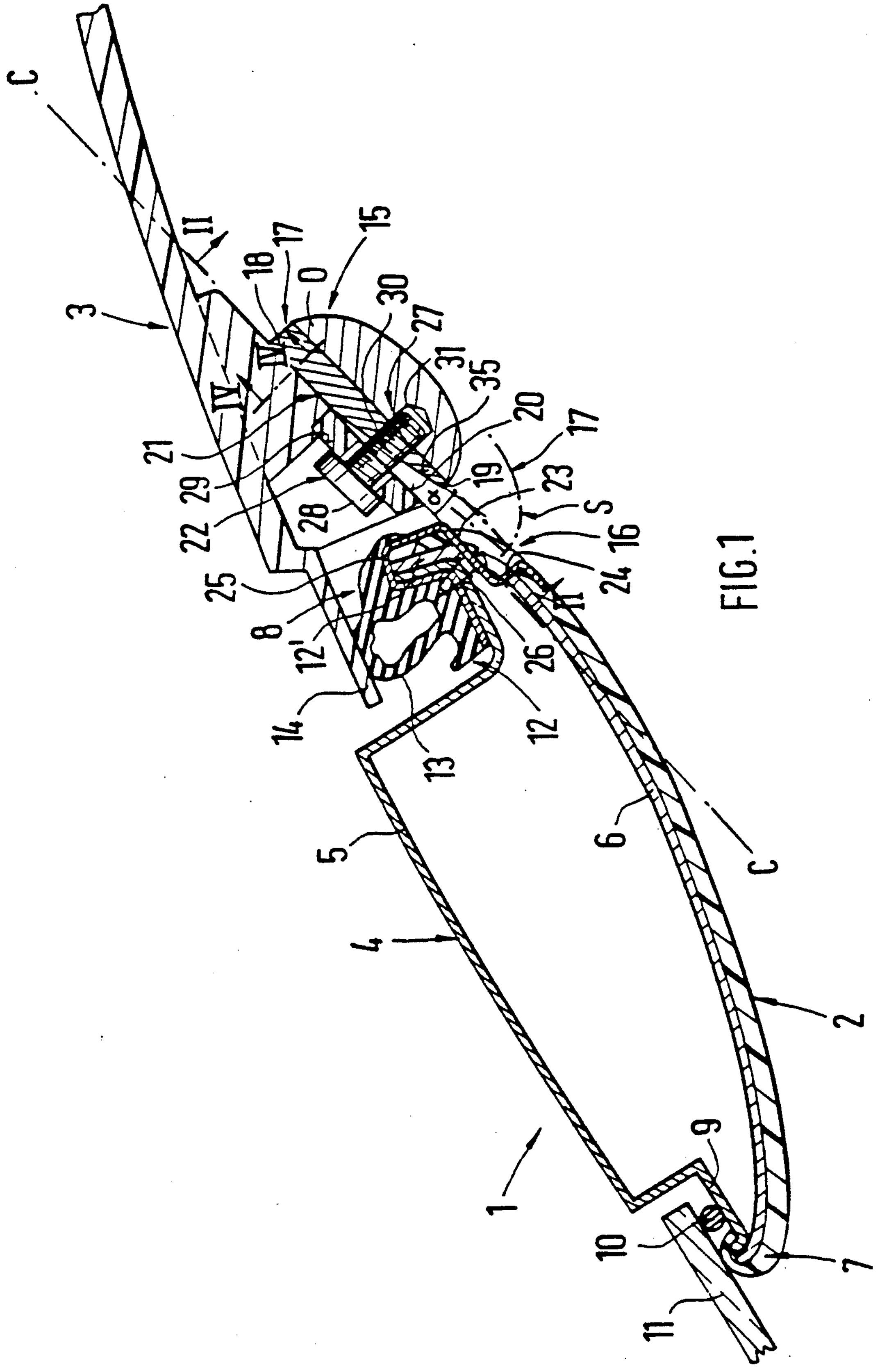
FIG. 1 is a longitudinal sectional view of a roof in the area of a windshield frame.

Referring to FIG. 1, there is shown only a partial section of a body 2 for a motor vehicle 1 including a removable roof 3 and a windshield frame 4. The windshield frame 4 is formed of a profiled outer shell 5 and an inner shell 6 which, as shown at locations 7 and 8, are connected with one another by means of welding, gluing or other suitable methods.

A windshield 11 rests on a flange 9 of the windshield frame 4 by means of an adhesive body 10. On the opposite side of the windshield frame 4, away from the flange 9, a groove 12 is provided with a sealing body 13. A web 14 of the roof 3 projects over this sealing body 13 in such a manner that the web 14 rests on the sealing body 13. The sealing body 13 extends around an upright flange 12' of the groove 12.

Figure 2:
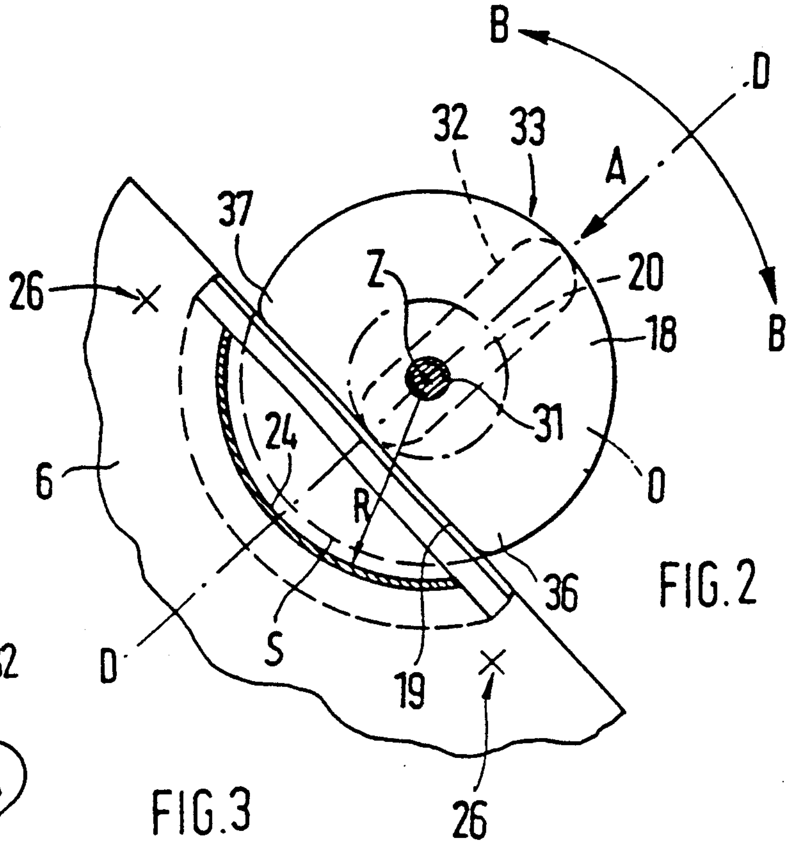
FIG. 2 is a sectional view according to Line II—II of FIG. 1.

The roof 3 is held at a fixed body part, i.e., the windshield frame 4, by means of a lock 15. The lock 15 includes a receiving device 16 located at the windshield frame 4 and a movable actuating member 17 located at the roof 3. The actuating member 17, formed as a circular cylindrical plate 18, is provided with a flattened area 19 over a portion of the cylindrical plate 18. The plate 18, by means of a sliding surface 20, rests against a flat wall 21 of the roof 3 and is pivoted there by means of a pin 22. With this construction and bearing, the actuating member 17, as a result of movements along a circular segment path in the range of 180°, i.e., in the direction of B—B as shown in FIG. 2, is adjusted from a closed position S to an open position O and vice versa. In the closed position S, the actuating member 17 extends over a supporting surface 23 of the receiving device 16. The sliding surface 20 and the supporting surface 23 are disposed in a common plane C—C which extends at a right angle to the pin 22. In addition, the supporting surface 23 has a boundary 24 extending along a radius R enclosing the center Z of the pin 22.

The receiving device 16 can be formed of a profiled sheet metal part 25. The sheet metal part 25 is fastened to the groove 2 by means of screws 26.

Figure 3:
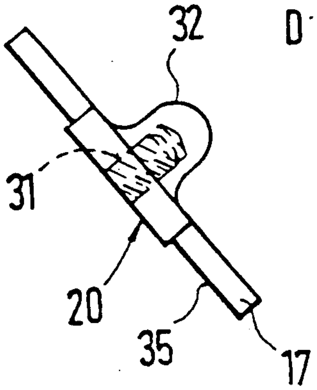
FIG. 3 is a view in the direction of Arrow A of FIG. 2.

The actuating member 17 and the pin 22 interact by means of a screwed connection 27. In this case, the pin 22 supports itself by means of a head 28 which rests on a bearing section 29 of the roof 3 and, by means of a threaded bolt 30, which projects into a threaded bore 31 in the actuating member 17. The actuating member 17 is provided with a rib-type grip part 32 in the area of the threaded bore 31. As shown in FIG. 3, on the side facing away from the sliding surface 20, the rib-type part 32 is aligned perpendicularly with respect to the circle segment-type flattened area 19 and extends away from the flattening along a longitudinal center plane D—D (FIG. 2) toward the edge 33 of the plate 18.

Figure 4:
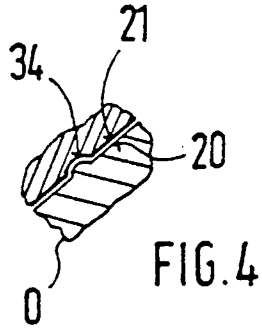
FIG. 4 is a sectional view according to Line IV—IV of FIG. 1.

As shown in FIG. 4, in order to fix the actuating member 17 in its open and closed positions, 0 and S, respectively, a detent arrangement 34 is provided between the sliding surface 20 and the wall 21 or the supporting surface 23. On the side of the circular sliding surface 20, the plate 18 has a stop slope 35 extending toward the flattening 19. This stop slope 35 extends at an angle o with respect to the sliding surface 20. As a result, the turning-in or closing of the actuating member 17, particularly at the transition areas 36, 37 between the flattening 19 and the plate 18, is made easily possible by means of the receiving device 16. Further, the actuating member 17, in its closed position S, rests under tension against the supporting surface 23.

Figure 5:
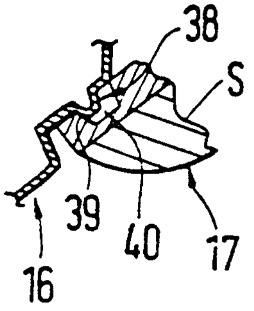
FIG. 5 is a partial view of FIG. 1.

As shown in FIG. 5, a fixing device 38 is provided between the actuating member 17 and the receiving device 16. The fixing device 38 includes a widening 39 at the receiving device 16 which interacts with a corresponding recess 40 of the actuating member 17.

What is claimed is:

1. A lock for a detachable vehicle body part, comprising:
- a fixed receiving device,
- a movable actuating member having a plate, wherein said plate is substantially circular and has a flattened segment along a portion of its circumference and further wherein the plate, by means of a sliding surface, rest against a flat wall section of a roof and is pivoted there by means of a pin in a manner to adjust the actuating member, by means of movements along a circular segment path, to a closed and open position,
- the actuating member reaching over the fixed receiving device in the closed position and extending away from the receiving device in the open position such that the flattened segment is spaced apart from the fixed receiving device in parallel thereto, said actuating member further provided with a recess along a portion of its circumference opposite said flattened segment;
- wherein the receiving device has a supporting surface for the plate, the supporting surface comprising a boundary, the boundary extending along a radius from the center of the pin;
- wherein the receiving device is a sheet metal part which is fastened to a sealing body by using screws;
- wherein the actuating member is provided with a rib-type grip part on its side facing away from the sliding surface;

- wherein the grip part is aligned perpendicularly with respect to the flattening and extends from the flattening along a longitudinal center plane to the edge of the plate;
- wherein the fixed receiving device includes a fixing means comprising a projected portion which engages into said recess of the actuating member.

2. A lock according to claim 1, wherein the actuating member interacts with the pin by means of a screwed connection.

3. A lock according to claim 1, wherein the pin includes a head and a threaded bolt, the head supporting itself on a bearing section of the roof and the threaded bolt interacting with a threaded bore of the actuating member.

4. A lock according to claim 1, wherein the actuating member is fixed in the closed position and in the open position by means of a detent arrangement.

5. A lock according to claim 1, wherein the plate, on the side of the sliding surface, has a stop slope for the receiving device, the stop slope sloping away from the sliding surface in the direction of the flattening.

6. A lock according to claim 4, wherein the plate, in the side of the sliding surface, has a stop slope for the receiving device, the stop slope sloping away from the sliding surface in the direction of the flattening.

7. A lock according to claim 1, further comprising a fixing device acting between the actuating member and the receiving device.

* * * * *